(12) United States Patent
Meade (10) Patent No.: US 9,454,739 B2
(45) Date of Patent: Sep. 27, 2016

(54) MULTI-PERIOD FINANCIAL SIMULATOR OF A PROCESS

(75) Inventor: David Meade, Grand Haven, MI (US)

(73) Assignee: Western Michigan Universitry Research Foundation, Kalamazoo, MI (US)

(*) Notice: Subject to any disclaimer, the term of this patent is extended or adjusted under 35 U.S.C. 154(b) by 1276 days.

(21) Appl. No.: 12/900,851

(22) Filed: Oct. 8, 2010

(65) Prior Publication Data

US 2011/0246257 A1 Oct. 6, 2011

Related U.S. Application Data

(63) Continuation-in-part of application No. 11/415,357, filed on May 1, 2006, now abandoned.

(51) Int. Cl.
*G06G 7/48* (2006.01)
*G06Q 10/06* (2012.01)

(52) U.S. Cl.
CPC .......... *G06Q 10/06* (2013.01); *G06Q 10/0633* (2013.01)

(58) Field of Classification Search
CPC .......................... G06Q 10/06; G06Q 10/0633
USPC ........... 703/6; 700/108, 238; 705/1.1, 14.18, 705/7.31, 7.37
See application file for complete search history.

(56) References Cited

U.S. PATENT DOCUMENTS

| | | | |
|---|---|---|---|
| 5,471,575 A | 11/1995 | Giansante | |
| 7,774,257 B2 * | 8/2010 | Maggioncalda et al. | ... 705/36 R |
| 7,818,150 B2 * | 10/2010 | Barnett | ............... G06F 11/3447 703/6 |
| 8,209,250 B2 * | 6/2012 | Bradway et al. | ........... 705/36 R |
| 2004/0044557 A1 | 3/2004 | Frech et al. | |
| 2006/0010057 A1 | 1/2006 | Bradway et al. | |
| 2006/0129970 A1 * | 6/2006 | Haas et al. | ..................... 717/104 |
| 2007/0233537 A1 | 10/2007 | Ficalora et al. | |
| 2007/0276634 A1 | 11/2007 | Smith et al. | |
| 2008/0004922 A1 | 1/2008 | Eder | |
| 2008/0027841 A1 | 1/2008 | Eder | |
| 2011/0125466 A1 * | 5/2011 | Lada | ................................ 703/2 |
| 2011/0313738 A1 * | 12/2011 | Stamoulis et al. | ................ 703/2 |

OTHER PUBLICATIONS

"Multi-Month Simulation of a Lean Manufacturing Implementation Program," David J. Meade, date unknown, 8 pages, 2006.

\* cited by examiner

*Primary Examiner* — Eunhee Kim
(74) *Attorney, Agent, or Firm* — Price Heneveld LLP (57) ABSTRACT

A system configured for predicting a financial impact of a process is provided that includes a financial forecasting system (FFS) having at least one operational parameter and at least one financial data. The system further includes a discrete event simulator (DES) in communication with the FFS, wherein the DES is configured simulate a process based upon the at least one operational parameter and the at least one financial data for a first period of time, communicate resultant data from the simulation to the FFS, such that the FFS is configured to update the at least one operational parameter and the at least one financial data, which are based upon the communicated resultant data, and the DES is further configured to simulate the process based upon the updated at least one operational parameter and the at least one financial data for a sequential second period of time. The FFS and the DES are further configured to replicate the simulations of the sequential first and second periods of time with the operational parameter and the financial data having different statistical variations, and determine a confidence interval associated with the communicated resultant data.

20 Claims, 9 Drawing Sheets

|  | Initial | Build-up | Ramp-down |
|---|---|---|---|
| Net Sales | 100,000 | 100,000 | 100,000 |
| Cost of Sales | | | |
| Raw Material | | | |
|     Purchases | 29,000 | 35,000 | 23,000 |
|     Inventory material:(increase) decrease | 0 | -6,000 | 6,000 |
| Total Material Cost | 29,000 | 29,000 | 29,000 |
| Processing Cost | | | |
|     Factory Wages | 11,000 | 11,000 | 11,000 |
|     Factory Salary | 2,000 | 2,000 | 2,000 |
|     Factory Benefits | 5,000 | 5,000 | 5,000 |
|     Services & Supplies. | 2,500 | 2,500 | 2,500 |
|     Depreciation | 2,000 | 2,000 | 2,000 |
|     Scrap | 2,000 | 2,000 | 2,000 |
| Total Processing Cost | 24,500 | 24,500 | 24,500 |
| Occupancy Cost | | | |
|     Building Depreciation | 200 | 200 | 200 |
|     Building Services | 2,000 | 2,000 | 2,000 |
| Total Occupancy Cost | 2,200 | 2,200 | 2,200 |
| Cost of Goods Manufactured | 55,700 | 55,700 | 55,700 |
| FG Inventory (Increase) decrease | 0 | -4,000 | 4,000 |
| Cost of Goods Sold | 55,700 | 51,700 | 59,700 |
| Gross Profit | 44,300 | 48,300 | 40,300 |
| Gross Profit % | 44.30% | 48.30% | 40.30% |

Changes in monthly reported gross profit resulting from inventory build-up and ramp down

MULTI-PERIOD FINANCIAL SIMULATOR OF A PROCESS

CROSS-REFERENCE TO RELATED APPLICATION

This application is a continuation-in-part of U.S. patent application Ser. No. 11/415,357, filed on May 1, 2006, now abandoned, by David Meade, the entire disclosure of which is hereby incorporated herein by reference.

FIELD OF THE INVENTION

The present invention relates to a system and method for simulating a process and, more specifically, to a system and method for determining how a specific process or operational strategy will effect the financial statement of the business over a span of multiple financial reporting or production periods.

BACKGROUND OF THE INVENTION

The purpose of any manufacturing business is to purchase raw materials and/or components and subsequently convert these materials and components into a product of greater value that can be sold for a higher price. It is in this manner that profit is made.

However, in order to be successful, a manufacturing business requires considerable planning. A manufacturer needs to control the types and quantities of materials they are purchasing, plan which products are to be produced as well as determine the quantities needed, and ensure that they are able to meet both current and future customer demand. Improper planning in any of these areas can readily lead to lost sales and decreased profits.

For instance, the purchasing of an insufficient quantity of an item used in manufacturing, or the wrong item, can result in the manufacturer being unable to supply enough of their product to a customer by an agreed upon date. To prevent the above from occurring, many companies will purchase excessive quantities of raw materials or items needed for the manufacturing process. However, this also results in money being wasted, as an excess quantity of materials and items tie up cash while they remain as stock. Similar to stock levels, the timing of a production run is also important. For example, beginning production of an order at the wrong time can lead to a customer deadline being missed, and ultimately, a loss in sales.

To facilitate the planning necessary for a successful manufacturing business, many manufacturers utilize a business planning technique known as Material Requirements Planning (MRP). The typical MRP system is a computer-implemented scheduling procedure for one or more production processes. Generally speaking, MRP systems automate the analysis of certain aspects of a manufacturer's operations in order to provide answers to three specific questions, including what items (i.e., raw materials and finished goods) are required, how many are required, and when are they required by.

Figure 1:
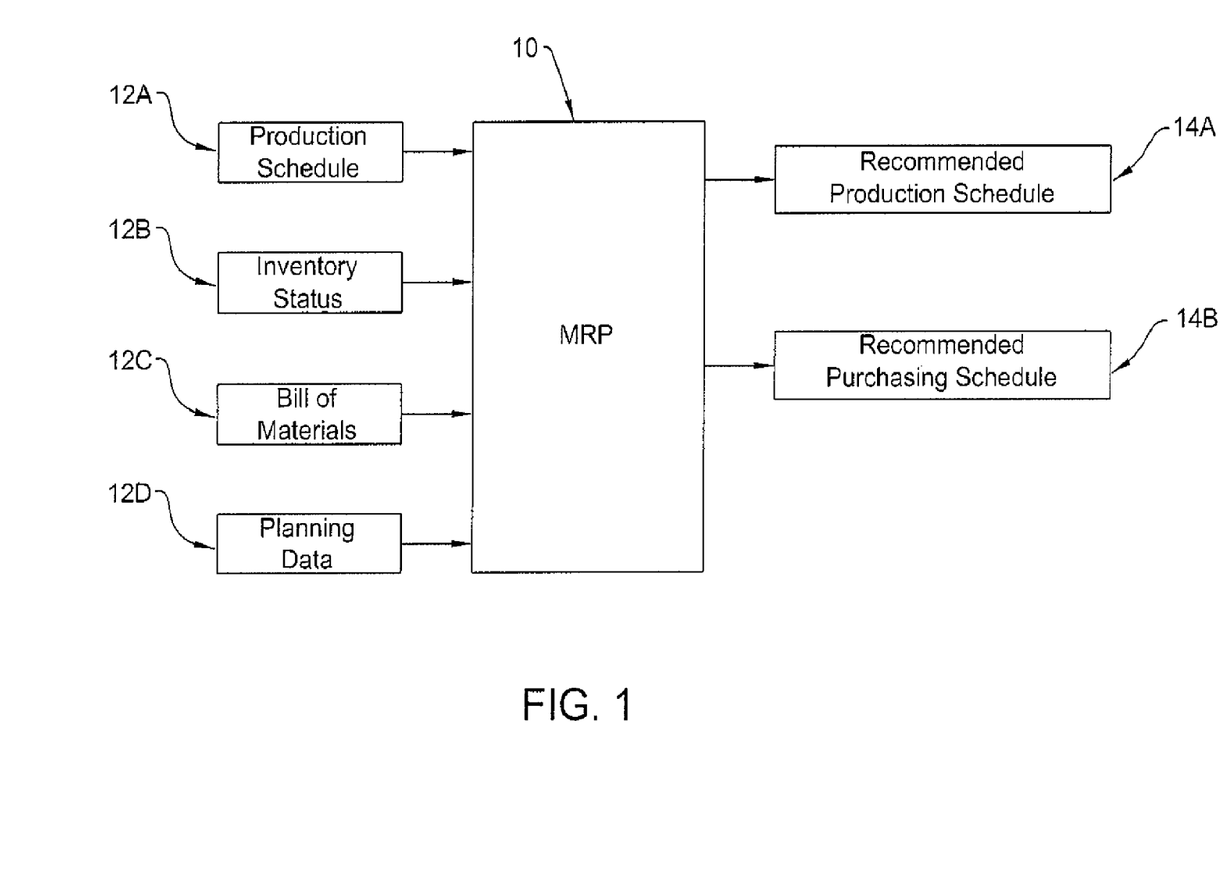
FIG. 1 illustrates a traditional Material Requirements Planning (MRP) system.

FIG. 1 depicts a typical Material Requirements Planning (MRP) system 10, which works on certain input data 12 provided to the system 10 in order to generate some specific output data 14. Data input into the MRP system 10 includes a production schedule 12A, which is a combination of all the known and expected demand over a defined period of time for the products being created. The production schedule provides information on the products being created, how much of the products are required at a time, and when a quantity of products is required to meet demand. Also input into the MRP system 10 is data concerning inventory status 12B, including records of net materials already in stock and available for use, as well as materials on order from suppliers. The MRP system 10 also requires a bill of materials 12C, which provides detailed information on the raw materials, components and subassemblies required to make each product. Lastly, the MRP system must be provided with certain planning data 12D, such as, for example, batch size or maximum amount of a material or item that can be processed at any one time.

The MRP system 10 analyzes the input data and generally provides recommendations on when a batch of product should be produced in order to meet an expected demand, as well as the amount of raw materials or items required for the production of the product. More specifically, the MRP system 10 outputs two types of data. The first output 14A is a recommended production schedule that lays out a schedule of the required minimum start and completion dates for production of a product, along with needed quantities of materials provided in the bill of materials. The second output 14B is a recommended purchasing schedule that lays out the dates that raw materials and components should be ordered as well as received.

Accordingly, the MRP system 10 is an automated set of techniques that analyzes production schedules, bill of materials, and inventory data in order to calculate stock or inventory requirements. The typical system also generates recommendations on when new materials should be purchased so as to maintain an inventory level necessary for the manufacturing of a product.

As such, Material Requirements Planning (MRP) systems are designed to facilitate the day-to-day operation of a manufacturing plant by generating recommended schedules on when production of a product should occur as well as when new inventory of materials and parts should be acquired. These recommended schedules are determined in response to the desired outcome of the manufacturing process as previously indicated to the MRP system (i.e., one desired outcome being the need to manufacture 200 widgets now, and maintain sufficient stock levels so that an additional 200 widgets can be manufactured two days from now). Thus, typical MRP systems focus on the manufacturing schedules necessary to meet a specific production goal, they do not focus on the actual manufacturing process itself, nor do they provide any analysis on how the manufacturing process may be potentially improved.

Similar to MRP systems, Discrete Event Simulators (DES) are a second type of computerized tool frequently utilized in a manufacturing environment. However, unlike MRP systems, Discrete Event Simulators analyze the actual manufacturing process, allowing a user to assess how the efficiency of a particular manufacturing process might be improved.

Specifically, a Discrete Event Simulator (DES) models a manufacturing process and simulates the behavior of the process as time progresses. The DES system evaluates the manufacturing process as consisting of discrete units of traffic that move or flow through a series of steps representing the various stages of an assembly line.

Figure 2:
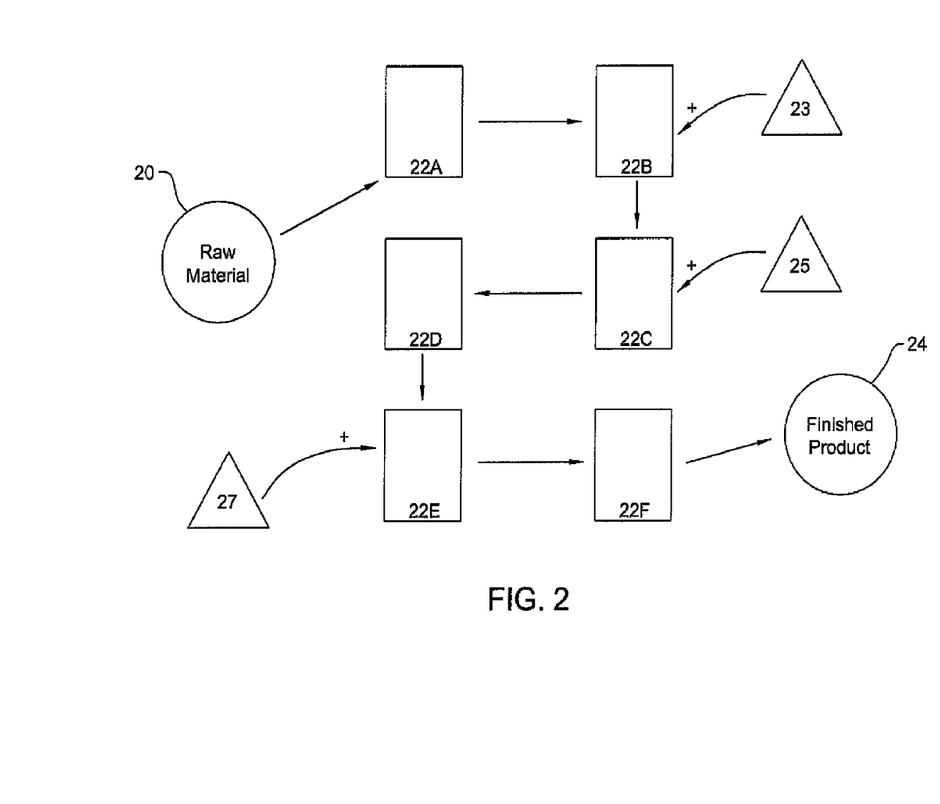
FIG. 2 illustrates a typical manufacturing process whereby raw materials or components are fed into and processed by an assembly line before ultimately becoming a finished product.

To further illustrate the above point, see FIG. 2, which depicts a process for manufacturing a specific product 24, such as, for example, a widget. One or more initial components or raw materials 20 are first introduced at a first stage 22A of an assembly line. Once initial processing is complete, the raw material 20 is passed through the remaining stages 22B-22F of the assembly line. Certain stages 22A, 22D, 22F may simply act upon or process the existing components of the unfinished widget, while other stages 22B, 22C, 22E supplement the unfinished widget with additional components 23, 25, 27. Ultimately the widget passes through the final stage 22F of the assembly line and becomes a finished product 24 that is ready to be sold.

To accurately model the widget manufacturing process, the DES system can be programmed to emulate the behavior of the various stages 22A-22F of the assembly line. This subsequently provides manufacturing personal with the ability to evaluate how the efficiency of the assembly line is affected in response to either a proposed or actual change to the manufacturing process.

To further illustrate the above point, consider another example wherein a DES system is configured to model the assembly line of FIG. 2. An engineer or other manufacturer personal subsequently alters the virtual behavior of stage 22D of the assembly line, programming the DES system to act as if the components making up stage 22D have been replaced by a newer, more efficient device. The simulated assembly line represented in the DES system is then allowed to run through one pass or iteration of the manufacturing process, thereby allowing the performance of the assembly line as well as any potential problems to hopefully be ascertained.

Figure 3:
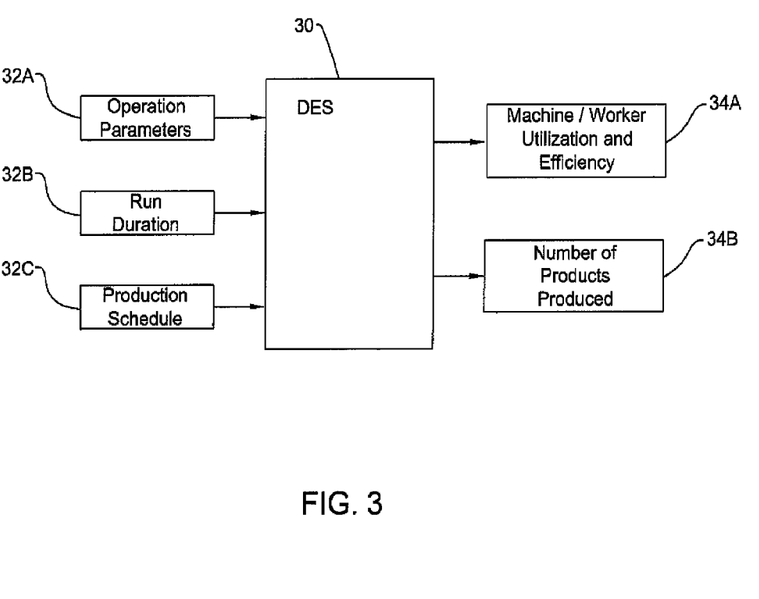
FIG. 3 illustrates a traditional Discrete Event Simulation system for evaluating alternative manufacturing processes on the basis of production capacity and process effectiveness.

FIG. 3 illustrates a traditional Discrete Event Simulator (DES) system 30. As depicted in FIG. 3, a traditional DES system 30 typically requires the input of three types of data. The first type of input data includes various operation parameters 32A specific for the manufacturing process/assembly line being evaluated. Parameters include, for example, the number of stations or machines in the assembly line, the product routing, and the available manpower, as well as various operational characteristics such as set-up data, cycle times, etc. The second type of input data includes the duration of the product run 32B. This duration value can be represented, for example, as a number of hours an assembly line is run, or alternatively, the number of units produced. The last type of input data provided to the DES system 30 is the production schedule 32C, which as previously discussed, represents both the known and expected demand for a product over a defined period of time. The production schedule provides information on the products being created, how much of the products are required at a time, and when a quantity of product is required to meet demand.

The DES system 30 subsequently analyzes the three types of input data 32A-32C described above and outputs two pieces of data that generally represents the efficiency of the manufacturing process. The first data output by the DES system 30 comprises one or more values representing a measured utilization or efficiency 34A of the machines and associated workers that make up the assembly line. From this data the manufacturer can determine, for example, the number of man hours that would be consumed by the simulated manufacturing process if it was actually implemented in real life. The data also provides a measurement of the percentage of time that a worker and their associated workstation were active verses idle. The second piece of data output by the DES system 30 comprises the estimated number of products that would be produced if the simulated manufacturing process were implemented in real life.

Accordingly, Discrete Event Simulators (DES) provide manufacturing personal with the ability to simulate a manufacturing process, and then determine how certain changes to one or more steps of the process affect the manufacturing efficiency for a product as indicated by resource utilization and number of products produced. Although useful, traditional DES systems are typically restricted in their functionality, being limited to providing information concerning manufacturing capacity, and process effectiveness comparisons for a single iteration of a manufacturing cycle, i.e., shift, day, week, month, number of hours, etc. Consequently, DES systems are typically considered useful primarily just for evaluating alternative approaches to process improvement.

Similar to other existing computer-based manufacturing aids, DES systems provide no insight or assistance on how proposed or actual changes in a manufacturing process effect the financial statements of the manufacturing business. Similarly, DES system are typically configured to only operate for a single manufacturing cycle, whereby the assembly line under investigation is activated for only a single run once the necessary input data is received by the DES system. Consequently, even if DES systems were capable of providing information concerning how changes in the manufacturing process impact the financial statements of the business, the resultant information would still be of questionable relevance due the DES system's lack of conducting repeated test cycles that allow for generated data to be fed back into the process and further refined.

SUMMARY OF THE INVENTION

According to one aspect of the present invention, a system configured for predicting a financial impact of a process is provided that includes a financial forecasting system (FFS) having at least one operational parameter and at least one financial data. The system further includes a discrete event simulator (DES) in communication with the FFS, wherein the DES is configured simulate a process based upon the at least one operational parameter and the at least one financial data for a first period of time, communicate resultant data from the simulation to the FFS, such that the FFS is configured to update the at least one operational parameter and the at least one financial data, which are based upon the communicated resultant data, and the DES is further configured to simulate the process based upon the updated at least one operational parameter and the at least one financial data for a sequential second period of time. The FFS and the DES are further configured to replicate the simulations of the sequential first and second periods of time with the operational parameter and the financial data having different statistical variations, and determine a confidence interval associated with the communicated resultant data.

According to another aspect of the present invention, a method for predicting a financial impact of a process is provided. The method includes the steps of (a) providing at least one operational parameter, (b) providing at least one financial data, (c) simulating a process based upon the at least one operational parameter and the at least one financial data for a first period of time, and (d) obtaining resultant data based upon the simulation. The method further includes the steps of (e) updating the at least one operational parameter and the at least one financial data based upon the resultant data, (f) simulating the process based upon the updated at least one operational parameter and the at least one financial data for a sequential second period of time, (g) replicating the steps (c)-(f) with the operating parameters and financial data having different statistical variations, and (h) determining a confidence interval associated with the resultant data.

According to yet another embodiment of the present invention, a computer readable medium for predicting a financial impact of a process is provided. The computer readable medium is configured to be executed and perform the steps of (a) receive at least one operational parameter, (b) receive at least one financial data, (c) simulate a process based upon the at least one operational parameter and the at least one financial data for a first period of time, and (d) obtain resultant data based upon the simulation. The method further includes the steps of (e) updating the at least one operational parameter and the at least one financial data based upon the resultant data, (f) simulate the process based upon the updated at least one operational parameter and the at least one financial data for a sequential second period of time, (g) replicate the steps (c)-(f) with the operating parameters and financial data having different statistical variations, and (h) determine a confidence interval associated with the resultant data.

BRIEF DESCRIPTION OF THE DRAWINGS

One or more embodiments of the present invention are illustrated by way of example and should not be construed as being limited to the specific embodiments depicted in the accompanying drawings, in which like references indicate similar elements and in which.

DETAILED DESCRIPTION

As previously discussed, the computer-aided tools traditionally utilized in the manufacturing industry are frequently limited in their functionality. These existing tools, such as Material Requirement Planning (MRP) systems and Discrete Event Simulators (DES), are typically configured to provide very specific and limited guidance with respect to either the ordering of parts and materials, or a predicted change in manufacturing efficiency in terms of resource utilization and production. Neither of these two types of traditional tools provides the ability to simulate a plurality of manufacturing periods and subsequently analyze how a change in the manufacturing process effects the financial statements of the business and/or how a change in the manufacturing process can effect a future financial performance of the business.

Figure 4:
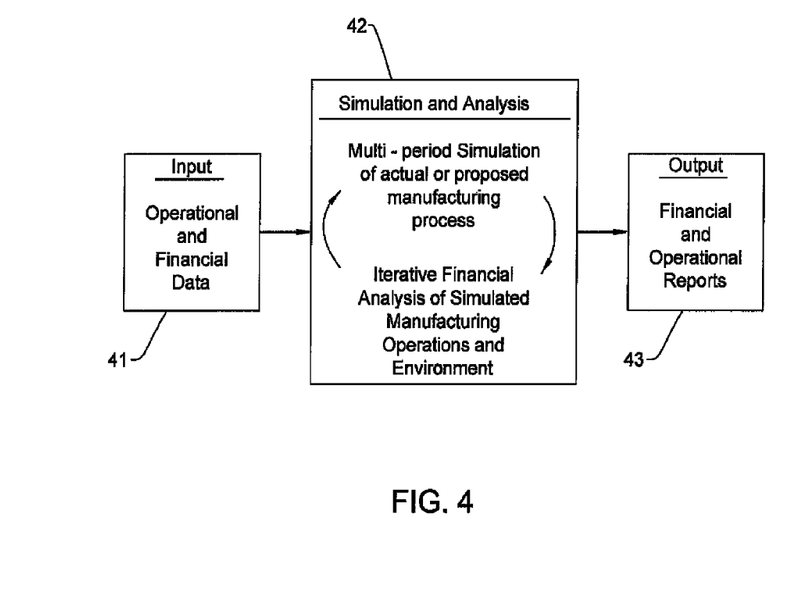
FIG. 4 illustrates a multi-period financial simulator for a manufacturing operation according to a first embodiment.

To address the deficiencies noted above, the Applicant has developed and disclosed within the present application a system and method for conducting multi-period financial simulations of a manufacturing operation. FIG. 4 depicts one such multi-period financial simulator according to a first embodiment of the invention.

As depicted in FIG. 4, the simulator system 42 is first programmed with various operational and financial data 41 related to the manufacturing process. The system 42 then proceeds to simulate the programmed manufacturing process, which represents either an actual process being implemented by the business, or alternatively a proposed manufacturing process being evaluated for possible implementation. While the manufacturing process is being simulated, the system 42 also carries out repeated or iterative financial analysis of the manufacturing operations and environment being simulated. Upon conclusion of the multi-period simulation, the system 42 outputs various financial and operational reports 43 indicating how the financial statements (e.g., the gross and net profit) of the business would be effected by actual implementation of the simulated manufacturing process.

To further understand the reasoning and underlying principles behind the present invention, it should be realized that the income statement or profits of a manufacturing business are effected by numerous factors. Some factors have an obvious effect on a business' income statement, while other factors effect the income statement in less obvious ways. Regardless, the present invention simplifies what otherwise could be a difficult financial analysis by establishing a process whereby a user, such as a financial planner of a business, can readily determine how one or more proposed changes to a manufacturing process effects the financials (i.e., gross and net profits) of the business. In general, the present invention accomplishes this by requiring a user to first input select data concerning the business and its operations. The system then employs a multi-period logic to determine how proposed changes to a manufacturing process would affect various other factors of the business, and subsequently, how these modified factors would effect the financial statement of the business.

Figure 5:
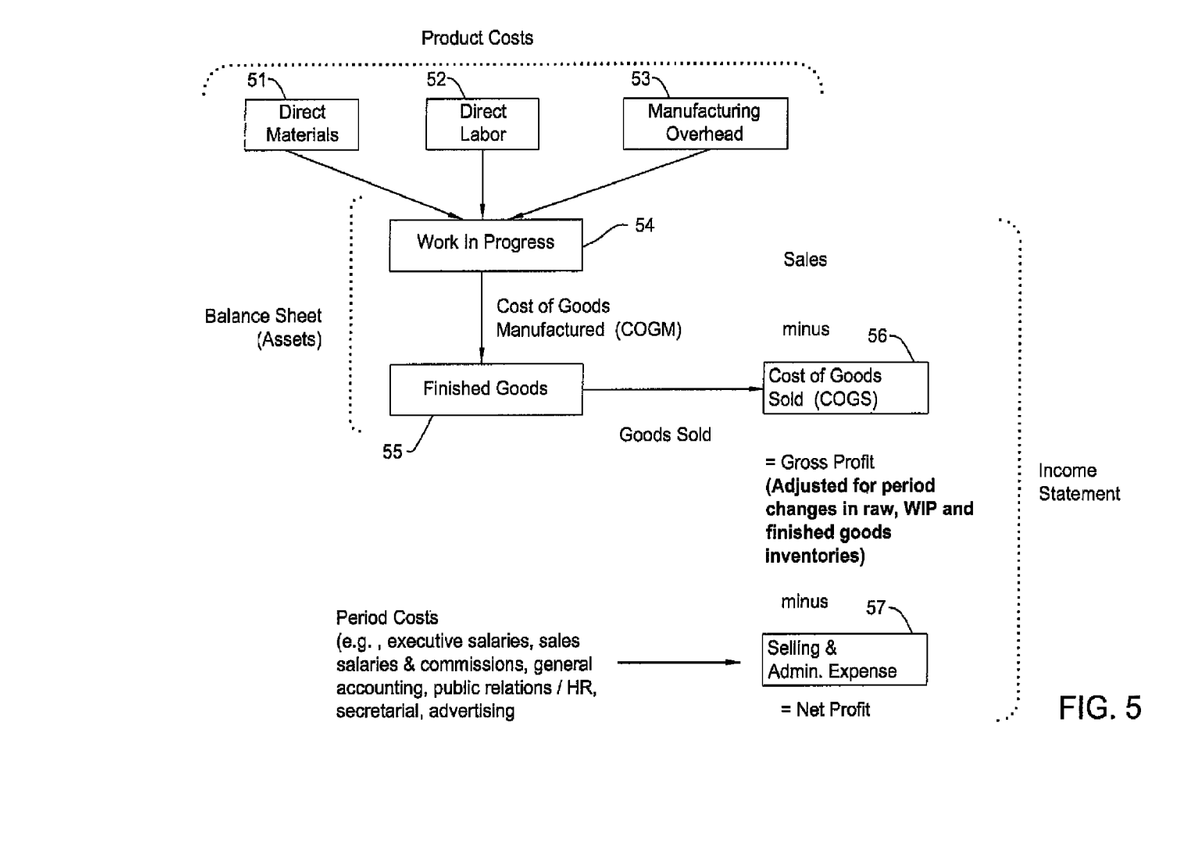
FIG. 5 depicts a chart illustrating some of the more common factors found in a manufacturing environment that determine the gross and net profits of the business.

To further illustrate the above point, consider the chart of FIG. 5, which illustrates some of the more common factors found in a manufacturing environment that determine the gross and net profits of the business. As depicted in FIG. 5, the direct costs of materials 51, direct costs of labor 52, and manufacturing overhead costs 53 all contribute to the actual cost of the goods being manufactured, which includes both the products in the process of being made 54, as well as the products that have completed manufacturing and are now finished goods 55. Product sales minus the cost of goods sold 56 subsequently yields the gross profit of the business, and upon subtraction of the selling and administrative expenses 57, yields the net profit of the business.

However, to complicate matters, the gross profit must be adjusted to account for the various assets held by the business, which include the raw materials held in inventory as well as the inventories of the work in progress and finished goods. Similarly, period adjustments must also be made to the selling and administrative expenses 57 before an accurate determination of net profit can be made.

Every factor identified above with respect to FIG. 5 can be directly or indirectly affected by even the slightest change in the manufacturing process. For example, one business may be considering the implementation of a lean manufacturing model in order to reduce the inventory levels that the business normally maintains. Such a proposed change would likely influence or change many factors, including not only the inventory levels, and thus the assets of the business, but also various other factors such as labor costs and overhead. The present invention simplifies the above process by employing multi-period logic to accurately track and determine how a specific change, such as decreased inventory levels, will effect every other aspect of the business, and in turn, their impact on the financial statement.

Accordingly, the present invention allows a business to quickly and easily test a proposed change to the manufacturing process (i.e., a modification to the assembly line) and determine how that proposed change would financially effect the business. Thus, for example, by implementing the multi-period financial simulator of the present invention, a manufacturer can readily ascertain what would happen to the gross and net profits of the business over the next X number of months if:

There is an increase/decrease in the number of labor hours required to produce product Y (i.e., due to changes in personal or equipment)?

There is an increase/decrease in the amount of finished product Y being produced over a specified period of time (i.e., the addition of a second assembly line)?

There is a decrease in the minimum level of inventory that must be maintained for raw materials and components (i.e., implementation of a lean manufacturing program)?

There is an increase in the amount of finished goods being held in inventory (i.e., due to increased production and/or decreased sales)?

There is an increase/decrease in the manufacturing overhead costs (i.e., building costs, utilities, etc.)?

There is an increase in the cost of labor?

There is an increase in the cost of raw materials and components?

Figure 6:
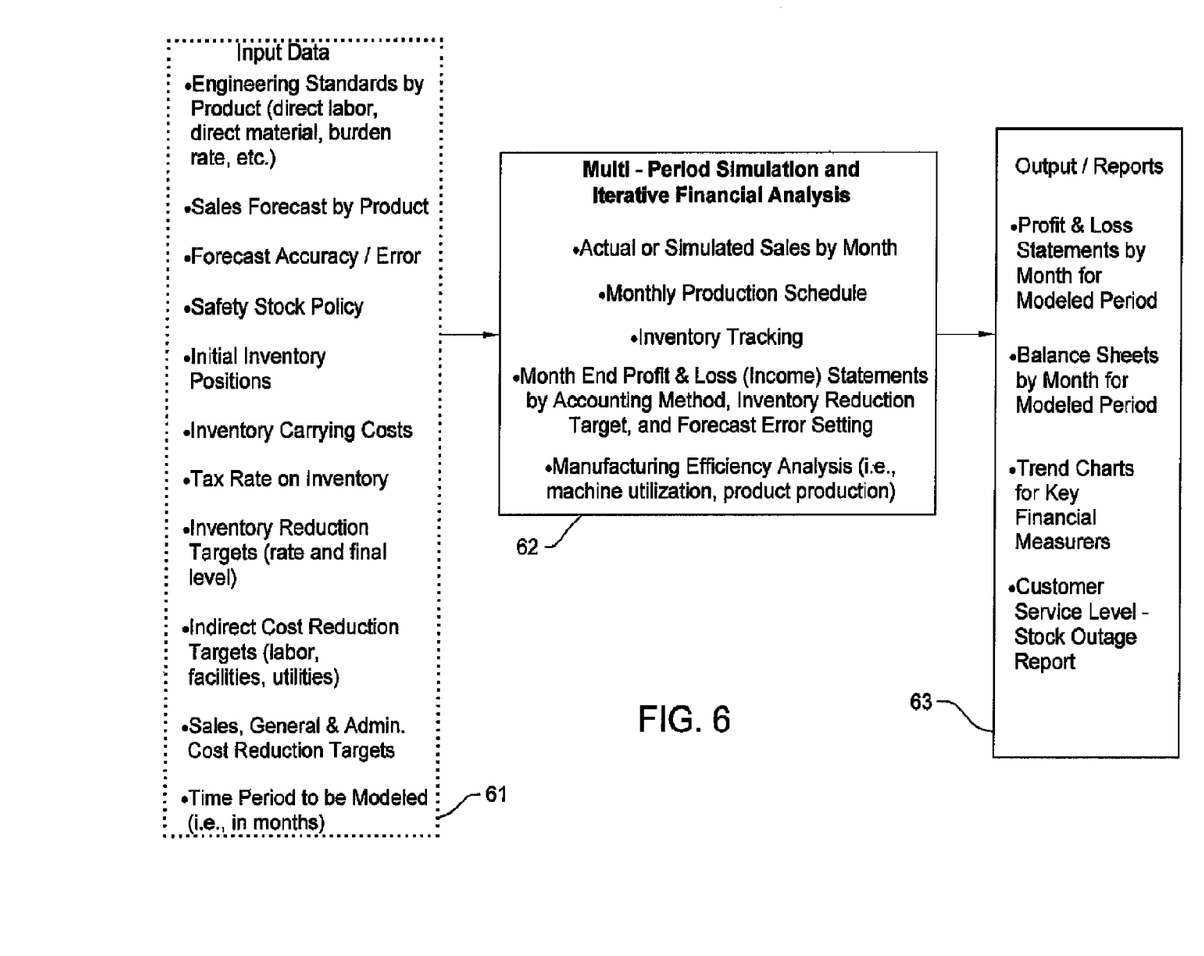
FIG. 6 illustrates a multi-period financial simulator for a manufacturing operation according to a second embodiment.

FIG. 6 illustrates a multi-period financial simulator for a manufacturing operation in accordance with another embodiment of the present invention. As illustrated in FIG. 6, the computer-based simulator system 62 is first programmed with various input data 61 describing select factors or operating parameters of the business. Depending on the business, the input data can include, for example, various engineering standards by product, sales forecast by product, the forecast accuracy, the safety stock policy, the initial inventory levels, the inventory carrying costs, the tax rate on the inventory, possible inventory reduction targets, various indirect cost reduction targets, sales, general and administrative cost reduction targets, and the desired time period that should be encompassed by the model or simulation being evaluated.

Once the input data 61 is received, the computerized financial simulator system 62 begins to analyze the data in accordance with its programmed, multi-period logic to determine how the proposed changes would effect the financial statement of the business. Specifically, the system 62 will simulate the proposed process for a given manufacturing period (i.e., one month) and subsequently process all of the data in accordance with its programmed logic to determine the financial effects of the proposed process. During this time, the system logic will not only conduct manufacturing efficiency analysis, but also carry out inventory tracking, develop a monthly production schedule, and determine monthly sales and month end profits and losses.

The system 62 will then repeat the analysis, running the simulation and processing the data for a second, subsequent manufacturing period (i.e., a second month). The system 62 will continue to do iterative analysis of the proposed changes for subsequent time periods until the end of the specified simulation time frame is reached.

The system 62 then generates or outputs various reports 63 concerning the operations and finances of the business. These reports 63 can include, for example, profit and loss statements by month, balance sheets by month, trend charts for key financial measurers, and customer service levels and stock outages.

To demonstrate the advantageous uses of the multi-period financial simulator as described above, consider an example where a manufacturing business seeks to determine what the financial results would be in response to implementing a lean manufacturing program that emphasizes minimizing the amount of all resources (including time) used in the manufacturing process. The simulator is provided with various input data describing select characteristics or operating parameters of the proposed lean manufacturing program. The simulator then attempts to model a real-world manufacturing operation where a schedule is established based on a forecast and current inventory levels. The simulated plant attempts to satisfy the schedule, at times falling short. At the conclusion of the month, profit and loss statements are produced based on the results of the period including actual sales. The process then repeats for each subsequent month for a total of 12 months.

The above simulation is run three times, with a different inventory reduction scenario being evaluated each time. The first scenario is a baseline, and represents no reduction in inventory over the twelve month simulated period. The second scenario assumes a "moderate" 50% reduction in on hand inventory over the twelve month period. The third scenario assumes an "aggressive" 50% reduction in inventory in the first six months, and then no further reductions for the remainder of the year.

Analysis of the three simulations indicate some interesting results. A no reduction in inventory policy produced the highest mean gross net profit for the first six months of the twelve month period evaluated. The aggressive reduction policy produced the lowest values for reported gross net profit during the same period. Starting with month seven and continuing through month twelve, the mean values for the no reduction policy and aggressive reduction policy were not significantly different, while the moderate reduction policy produced lower profit values for the same period. For further details concerning this example and its analysis, see "Multi-Month Simulation of a Lean Manufacturing Implementation Program" by David J. Meade and Sameer Kumar, herein incorporated by reference.

According to a second example, the multi-period financial simulator of the present invention can be used to assess the impact that a manufacturing plant consolidation would have on the monthly financial performance of the business. In this example, simulation data could assist the manufacturer in identifying a target level for increased finished goods inventories necessary to allow the disruptions in manufacturing when equipment is taken off-line to be moved.

Figure 7:
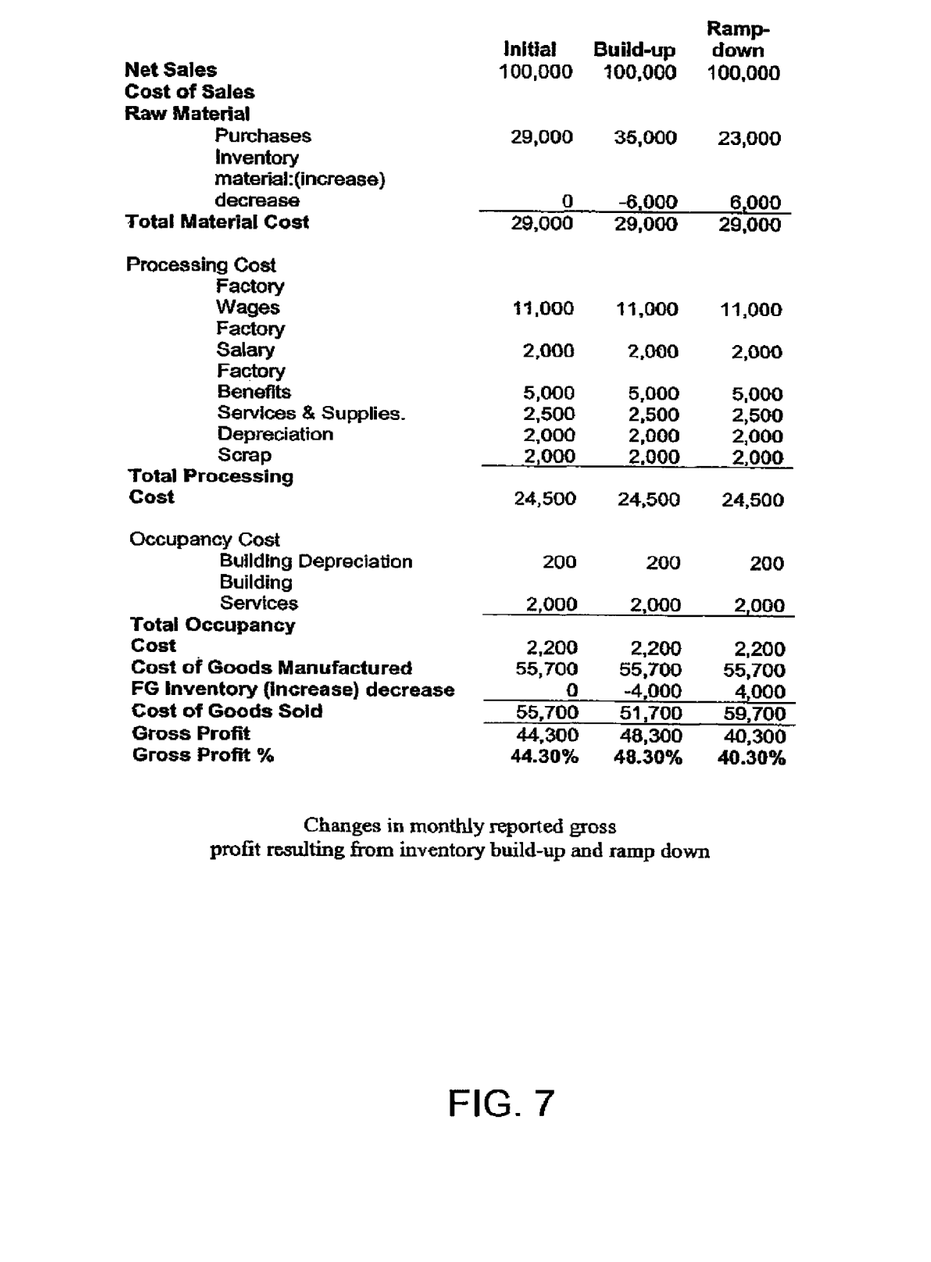
FIG. 7 depicts an applied example of a multi-period financial simulator indicating how changes in monthly reported gross profit can result from inventory build-up and ramp down.

Simulation results indicate that the temporary increases in inventory will have the effect of increasing the reported gross and net profits of the business while more products are being produced than sold. However, the opposite will occur when the products are then consumed, returning the inventory levels back to where they were before plant consolidation. See FIG. 7, which depicts how changes in monthly reported gross profit can result from inventory buildup and ramp down. In this specific example, FIG. 7 clearly identifies the impact to the income statement resulting from only one project factor-inventory.

Note that a multi-period model would allow the modeling of a ramp-up in capacity as equipment is coming back on-line in the new location and the learning curve effects are being experienced. This combined with the ability to simulate the effects of forecast inaccuracies would allow a manufacturer to not only identify how much inventory to buildup ahead of the change, but also what products to build-up, leading to better predictions resulting in a reduction in stock-outs, or missed shipments, during the project implementation.

According to a third example, a manufacturer is supplementing their business through the addition of new capital equipment. The replacement of existing equipment or capacity expansion through the addition of new equipment requires production planning changes to accommodate the project. As in the previous examples, the present invention can be utilized to quickly and easily determine how the addition of new capital equipment would effect the short-term financial results, which may be opposite of what is expected depending on the potential disruption to short-term capacity. As in the second example, an inventory build-up may be required in anticipation of the affects of the learning curve with the new equipment. In this case, the same considerations exist as were discussed in the prior example. Again, multi-period simulation by the present invention would aid the planning of this project through the prediction of the impact to on-hand inventories as well as on financial statements.

In the embodiments disclosed above, the multi-period financial simulator is a stand-alone computer system comprising at least a processor and memory for the storage and enablement of the multi-period logic and running of simulations, along with one or more inputs for the receipt of input data required by the simulator. The simulator system may further include a user interface, such as a keyboard, to facilitate the entry of data into the system.

As previously indicated, the multi-period financial simulator as discussed above provides its own unique functionality that allows it to evaluate the effects of a manufacturing process on the financial statement, in addition to the same functionality offered by traditional discrete event simulator (DES) systems. Accordingly, the financial simulator can operate independent of, as well as readily replace, a traditional DES system. However, according to an alternative embodiment, the multi-period financial simulator could be configured to work in conjunction with a traditional DES system. In such a system, the financial simulator would have to be configured to receive the limited data generated by the DES system. For example, the financial simulator could be networked with the DES system so as to directly receive the data, or alternatively, simply receive the DES data indirectly through manual intervention by a user.

Figure 8:
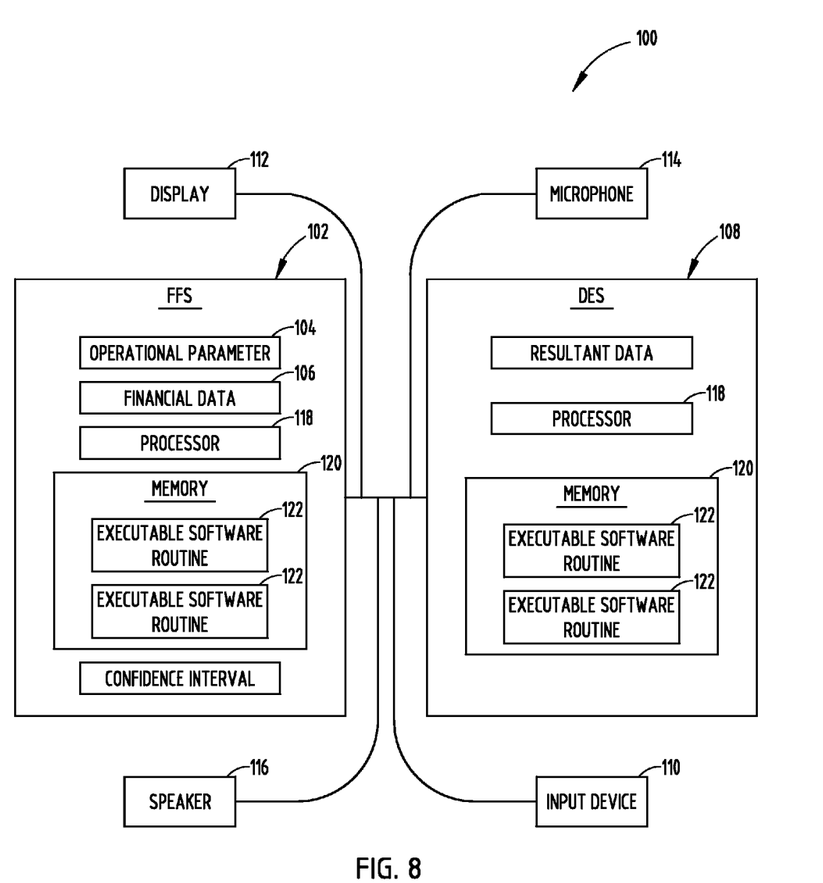
FIG. 8 is a schematic diagram of a system configured for simulation, in accordance with one embodiment of the present invention.

According to one embodiment, a system 100 (e.g., the simulation system 42) that can be configured for evaluating or predicting a financial impact or an effectiveness (e.g., efficiency) of a process is generally shown in FIG. 8 at reference identifier 100. The process described herein is a manufacturing process for purposes of explanation and not limitation, and it should be appreciated by those skilled in the art that the system 100 can be utilized with other business processes that have a financial outcome. Other examples of processes can be, but are not limited to, business processes, pharmaceutical processes, and healthcare processes.

The system 100 can include a financial forecasting system (FFS) generally indicated at reference identifier 102, that includes at least one operational parameter 104, and at least one financial data 106 (e.g., the operational and financial data 41). The system 100 can also include a DES 108 that is in communication with the FFS 102, wherein the DES 108 can be configured to simulate a manufacturing process based upon the at least one operational parameter 104 and the at least one financial data 106 for a first period of time. The DES 108 can be further configured to communicate resultant data (e.g., the outputted various financial and operational reports 43) from the simulation to the FFS 102, such that the FFS 102 can be configured to update the at least one operation parameter 104 and the at least one financial data 106, which can be based upon the communicated resultant data. The DES 108 can be further configured to simulate the manufacturing process based upon the updated at least one operational parameter 104 and the at least one financial data 106 for a sequential second period of time. Further, the FFS 102 and the DES 108 can be configured to replicate the simulations of the sequential first and second periods of time with at least partially different operational parameter and financial data, and determine a confidence interval associated with the communicated resultant data, as described in greater detail herein.

The FFS 102 and the DES 108 can be configured to continuously alter the at least one operational parameter 104 and the at least one financial data 106 during the simulation of the sequential periods, and continuously replicate the simulations until a desired confidence interval is obtained. Alternatively, the system 100 can be configured to replicate the simulations for a determined number of times, and output the resultant data and the confidence interval. For purposes of explanation and not limitation, the desired confidence interval can be approximately ninety-five percent (95%). However, it should be appreciated by those skilled in the art, that the desired confidence interval can be altered, such as by a user of the system 100, so that the desired confidence interval can be greater than or less than ninety-five percent (95%). As discussed in greater detail below, a number of replications needed to obtain a desired confidence interval can be based upon an acceptable relative error.

Typically, the operational data and the financial data are altered and returned (e.g., the resultant data) to be used in the simulation of the next sequential period. However, the resultant data from a first simulation (e.g., original simulation of the sequential periods) is not used in a first replication (e.g., second simulation of the sequential periods). Instead the operational data and the financial data used in the first replication is the same operational data and financial data that is used in the first simulation, but having different statistical variations. Otherwise, using the same operational data and the same financial data with the same statistical variations in the first simulation and the first replication would result in the exact same resultant data, and thus, an inaccurate confidence interval.

For purposes of explanation and not limitation, the different statistical variations can be based upon a random number generator. In other words, if step 1 of a first sequential period of a simulated process takes 10-15 seconds to complete, and step 2 takes 12-17 seconds to complete, the operational data will be a number between 10 and 15 for step 1 and between 12 and 17 for step 2. Thus, in the first simulation the operational data can be selected by the random number generator to be 11 for step 1 and 17 for step 2, and in the first replication the operational data can be selected by the random number generator to be 10 for step 1 and 12 for step 2. However, it should be appreciated by those skilled in the art that there can be additional or alternative ways to alter the statistical variation (or alter the value within a range of statistical variations).

By way of explanation and not limitation, the FFS 102 and the DES 108 can be configured to simulate for approximately twelve (12) sequential periods of time. However, it should be appreciated by those skilled in the art that any number of sequential periods of two or greater can be used. Such sequential periods can represent any unit of time measurement, such as, but not limited to, seconds, minutes, hours, days, weeks, months, years, the like, or a combination thereof. In such an embodiment, the twelve (12) sequential periods of time can be the twelve (12) calendar months in a year (i.e., January through December). The FFS 102 and the DES 108 can be further configured to replicate the simulated sequential time periods. Thus, the system 100 can be configured to simulate sequential time periods that represent one (1) calendar year, and then replicate the simulations for the one (1) calendar year one or more times. The FFS 102 and the DES 108 can also be configured to determine a confidence interval for the resultant data replicated for the approximately twelve (12) sequential periods of time, and/or determine the amount of replications that need to be performed to achieve the desired confidence interval. Therefore, depending upon the results of the simulations, the number of replications, the like, or a combination thereof, a confidence interval of the resultant data can be determined. As discussed in greater detail below, a number of replications needed to obtain a desired confidence interval can be based upon an acceptable relative error.

Another example is that the system 100 can be configured to simulate manufacturing processes over an allotted time period (e.g., twelve (12) months), and then replicate such simulations in order to generate data associated with the allotted time in conjunction with a confidence interval as to the accuracy of the generated data. Therefore, a user of the system 100 receives the expected results of the manufacturing process and a level of confidence as to how precise the results would be in a real-world application. In other words, if the simulations generate resultant data of a $1 million to $1.1 million net profit over twelve (12) months, the system 100 can also generate a confidence interval, such that due to the replications, the system 100 is ninety-five percent (95%) accurate (or confident) that the net profit will be within the $1 million to $1.1 million range. The system 100 can be further configured to provide additional data, such that the system 100 is ninety-nine percent (99%) accurate that the net profits will be between $800,000 and $1.3 million. However, it should be appreciated by those skilled in the art that the manufacturing process and resultant data are for purposes of explanation and not limitation, and that the system 100 can be configured to simulate, replicate, and generate data in other real-world scenarios.

The system 100 can include a user input device 110, wherein the at least one operational parameter 104 and the at least one financial data 106 are inputted with the user input device 110, according to one embodiment. The system 100 can also include other hardware or software components, such as, but not limited to, a display (e.g., monitor) 112, microphone 114, speakers 116, electronic circuitry, one or more processors 118, one or more memory devices 120, one or more executable software routines 122, the like, or a combination thereof. Thus, the operational parameters, 104, the financial data 106, other suitable data may be entered into the system 100, and the resultant data, confidence interval, and other suitable data from the simulations and the replications can be provided to the user. It should be appreciated by those skilled in the art that the components of the FFS 102 and the DES 108, or otherwise included in the system 100, can be at least partially shared or separate.

The confidence interval can be determined in various ways, wherein one exemplary method of determining a confidence interval or the number of replications needed to achieve a confidence interval is based upon a relative error value. In such an exemplary method, a point estimate, which is a single value estimate of a parameter of interest, is calculated for a mean (g) and standard deviation (s or a) of the population. The average of the sample values ($\bar{x}$) can be calculated by the following equation:

$$\bar{x} = \frac{\sum_{i=1}^{n} x_i}{n} \quad \text{(Eq. 1)}$$

wherein n is the sample size (number of observations), and $x_i$ is the value of ith observations.

The standard deviation (s) for the population can be calculated by the following equation:

$$s = \sqrt{\frac{\sum_{i=1}^{n} [x_1 - \bar{x}]^2}{n-1}} \quad \text{(Eq. 2)}$$

The confidence interval can be range within which there is a certain level of confidence that the true mean falls. The confidence interval can be symmetric about, and the distance that each endpoint is from $\bar{x}$ is referred to as the half-width (hw). The half-width can be calculated by the following equation:

$$hw = \frac{(t_n - 1, \alpha/2)s}{\sqrt{n}} \quad \text{(Eq. 3)}$$

The confidence interval can be expressed as the probability (P) that the unknown mean (g) lies within the interval $\bar{x}$+/−hw. Also, a significance level ($\alpha$) is the complement of P, or expressed as:

$$\alpha = 1 - P \quad \text{(Eq. 4)}$$

Thus, the confidence interval can be expressed by the following equation:

$$P(\bar{x} - hw \leq \mu \leq \bar{x} + hw) = 1 - \alpha \quad \text{(Eq. 5)}$$

As discussed above, the confidence interval can be based upon a relative error (re) value. The relative error (re) can be expressed by the following equation:

$$(hw = re|\mu|) \quad \text{(Eq. 6)}$$

The relative error (re) allows for the error to be represented by a percentage rather than an absolute value. Thus, the approximate number of replications (n') needed to obtain a point estimate ($\underline{x}$) with a certain percentage error can be determined by the following equation:

$$n' = \left[\frac{(z_{\alpha/2})s}{\left(\frac{re}{(1+re)}\right)\bar{x}}\right]^2 \quad \text{(Eq. 7)}$$

Therefore, a user can insert the desired confidence interval and the system 100 can determine the number of replications needed to obtain the desired confidence interval. Typically, as the desired confidence interval increases, and amount of replications performed increases non-linearly (e.g., exponentially). The above-described method or other methods of determining a confidence interval and/or the number of replications of obtaining a desired confidence interval are described in Harrell, Ghosh, and Bowden, *Simulation Using Promodel* ($2^{nd}$ ed.) New York: McGraw-Hill, 2003, and Law and Kelton, *Simulation Modeling and Analysis*, McGraw-Hill Higher Education, 2000, the entire references hereby being incorporated herein by reference.

Figure 9:
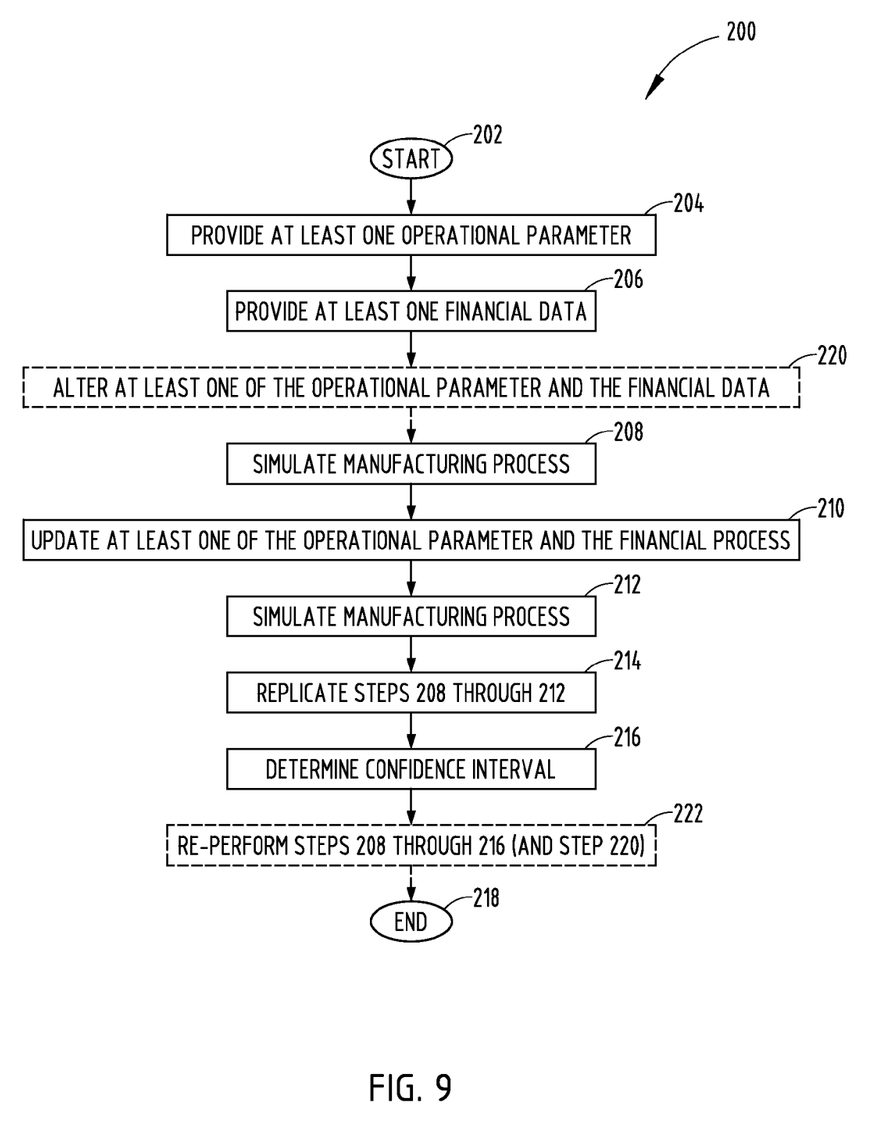
FIG. 9 is a flowchart of a method of simulation, in accordance with one embodiment of the present invention.

With respect to FIGS. 1-9, a method for predicting a financial impact of a manufacturing process is generally shown in FIG. 9 at reference identifier 200. The method 200 can start at step 202, and proceed to step 204, wherein the at least one operational parameter 104 is provided. At step 206, the at least one financial data 106 is provided, and at step 208, a manufacturing process is simulated based upon the at least one operational parameter 104 and the at least one financial data.

The method 200 can proceed from step 208 to step 210, wherein the at least one operational parameter 104 and the at least one financial data are updated based upon the resultant data. At step 212, the manufacturing process is simulated based upon the updated at least one operational parameter 104 and the at least one financial data 106 for the sequential second period of time. Steps 208 through 212 are replicated at step 214 with at least partially different operating parameters 104 and financial data 106. At step 216, a confidence interval associated with the resultant data is determined, and the method 200 can then end at step 218.

According to one embodiment, the method 200 can further include step 220, wherein the at least one operational parameter 104 and the at least one financial data 106 can be altered. The method 200 can also include step 222, wherein steps 208 through 216, and step 220 are continued to be performed. In such an embodiment, the desired confidence interval can be approximately ninety-five percent (95%). However, it should be appreciated by those skilled in the art, that the desired confidence interval can be altered, such as by a user of the system 100, so that the desired confidence interval is greater than or less that ninety-five percent (95%).

The method 200 can update the at least one operational parameter 104 and the at least one financial data 106 based upon the resultant data, according to one embodiment. The method 200 can also simulate the manufacturing process based upon the updated at least one operational parameter 104 and the at least one financial data 106 for approximately twelve (12) sequential periods of time. In such an embodiment, the method 200 can replicate the simulations of approximately twelve (12) sequential periods of time, and determining the confidence interval for the resultant data replicated for the approximately twelve (12) sequential periods of time.

According to one embodiment, a computer readable medium for predicting a financial impact of a manufacturing process can be configured to be executed and perform one or more steps. The one or more steps can include receiving at least one operational parameter 102, receiving at least one financial data 104, and simulating a manufacturing process based upon the at least one operational parameter 102 and the at least one financial data 104 for the first period of time. The computer readable medium can be executed to further perform the steps of obtaining resultant data based upon the simulation, updating the at least one operational parameter 102 and the at least one financial data based upon the resultant data, and simulating the manufacturing process based upon the updated at least one operational parameter and the at least one financial data for a sequential second period of time. Additionally, the computer readable medium can be executed to perform the steps of replicating the steps of simulating the manufacturing process for the first period of time, obtaining resultant data, updating the at least one operational parameter and the at least one financial data, and simulating the manufacturing process for a sequential period of time. Also, the computer readable medium can be executed to perform the step of determining a confidence interval associated with the resultant data.

The computer readable medium can be executed to perform the steps of altering the at least one operational parameter and the at least one financial data, and continue to perform one or more steps until a desired confidence interval is obtained, according to one embodiment. By way of explanation and not limitation, the one or more steps that are continuously performed until a desired confidence interval is obtained are the steps of simulating a manufacturing process for the first period of time, obtaining resultant data, updating the at least one operational parameter and the at least one financial data, simulating the manufacturing process based upon the second period of time, replicating one or more steps, determining a confidence interval, and determining if the confidence interval is approximate the desired confidence interval.

Additionally or alternatively, the computer readable medium can be further configured to update the at least one operational parameter and the at least one financial data based upon the resultant data, and simulate the manufacturing process based upon the updated at least one operational parameter and the at least one financial data for approximately twelve (12) sequential periods of time. In such an embodiment, the computer readable medium can be further configured to replicate the simulations of approximately twelve (12) sequential periods of time, and determine the confidence interval for the resultant data replicated for the approximately twelve (12) sequential periods of time.

The computer readable medium can be configured to communicate with a user input device 110, wherein the at least one operational parameter 104 and the at least one financial data 106 are inputted with the user input device 100, according to one embodiment. The computer readable medium can also be configured to communicate with other hardware or software components, such as, but not limited to, a display (e.g., monitor), microphone, speakers, electronic circuitry, one or more processors, one or more executable software routines, the like, or a combination thereof. Thus, the operational parameters, 104, the financial data 106, other suitable data that is processed by the computer readable medium, and the resultant data, confidence interval, and other suitable data from the simulations and the replications can be provided to the user.

Advantageously, the system 42, 100, the method 200, and/or the computer readable medium are configured to simulate real-world processes (e.g., manufacturing processes, business, healthcare, pharmaceutical, etc.), wherein at least one of operational parameters and financial data are different during sequential periods of time based upon simulations of previous sequential periods of time. Further, the simulations of the sequential periods of time can be replicated so that the resultant data of the simulations can be associated with a confidence interval. However, it should be appreciated by those skilled in the art that the system 42, 100, the method 200, and/or the computer readable medium can have additional or alternative advantages. Further, it should be appreciated by those skilled in the art that the elements described above can be combined in additional or alternative manners not explicitly described herein.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system configured for predicting a financial impact of a process, said system comprising:
   a financial forecasting system (FFS), wherein the FFS is configured to receive starting input comprising at least one initial operational parameter and at least one initial financial data, said FFS having a first output based on the at least one initial operational parameter and the at least one initial financial data which comprises:
   at least one operational parameter; and
   at least one financial data; and
   a discrete event simulator (DES) in communication with said FFS, wherein said DES is configured to simulate a process based upon said at least one operational parameter for a first period of time, communicate resultant DES data from said simulation to said FFS, such that said FFS is configured to determine at least one updated operational parameter based upon said communicated resultant DES data and to determine at least one updated financial data based upon said communicated resultant DES data, and said DES is further configured to again simulate said process based solely upon said at least one updated operational parameter for a sequential second period of time,
   wherein said FFS and said DES are further configured to replicate said simulations of said sequential first and second periods of time a plurality of times utilizing at least one new operational parameter and at least one new financial data that are utilized as inputs to said FFS, wherein the at least one new operational parameter and the at least one new financial data comprise statistical variations of the at least one initial operational parameter and the at least one initial financial data, and determine a confidence interval associated with at least one of said at least one updated operational parameter and said at least one updated financial data.

2. The system of claim 1, wherein said FFS and said DES are further configured to continuously alter said at least one operational parameter and said at least one financial data during said simulating of said sequential periods, and continuously replicate said simulations until a desired confidence interval is obtained.

3. The system of claim 1, wherein said confidence interval is based upon an acceptable relative error.

4. The system of claim 1, wherein as said confidence interval increases, an amount of said replications performed increases non-linearly.

5. The system of claim 1, wherein said FFS and said DES are further configured to simulate for twelve (12) sequential periods of time, and replicate said simulations of twelve (12) sequential periods of time.

6. The system of claim 5, wherein said FFS and said DES are further configured to determine a confidence interval for said resultant data replicated for said twelve (12) sequential periods of time.

7. The system of claim 1 further comprising a user input device, wherein said at least one operational parameter and said at least one financial data are inputted with said user input device.

8. The system of claim 1, wherein said FFS comprises at least one hardware component and at least one executable software routine.

9. The system of claim 1, wherein said DES comprises at least one hardware component and at least one executable software routine.

10. A method for predicting a financial impact of a process, said method comprising the steps of:
    (a) providing at least one initial operational parameter;
    (b) providing at least one initial financial data;
    (c) simulating a process using a discrete event simulator (DES) based upon said at least one operational parameter for a first period of time;
    (d) obtaining resultant data based upon said simulation;
    (e) utilizing said at least one operational parameter to determine at least one updated operational parameter and said at least one financial data to determine at least one updated financial data based upon said resultant data;
    (f) simulating said process using the DES based upon said at least one updated operational parameter for a sequential second period of time;
    (g) replicating said steps(a)-(f) at least once with said at least one initial operating parameter and said at least one initial financial data having different statistical variations relative to the at least one initial operational parameter and the at least one initial financial data utilized a first time steps (a)-(f) are conducted; and
    (h) determining a confidence interval associated with at least one of said at least one updated operational parameter and said at least one updated financial data.

11. The method of claim 10 further comprising the steps of:
    (i) altering said at least one operational parameter and said at least one financial data; and
    (j) continuing to perform steps (a)-(i) until a desired confidence interval is obtained.

12. The method of claim 10, wherein said confidence interval is based upon an acceptable relative error.

13. The method of claim 10, wherein as said confidence interval increases, an amount of said replications performed increases non-linearly.

14. The method of claim 10 further comprising the steps of:
    simulating said process based upon said at least one updated operational parameter for twelve (12) sequential periods of time;
    replicating said simulations of twelve (12) sequential periods of time; and
    determining said confidence interval for said at least one of said at least one updated operational parameter and said at least one updated financial data after twelve (12) sequential periods of time.

15. A system configured for predicting a financial impact of a process, said system comprising:

a financial forecasting system (FFS), wherein the FFS is configured to receive starting input comprising at least one initial operational parameter and at least one initial financial data, said FFS having a first output based on the at least one initial operational parameter and the at least one initial financial data which comprises:
  at least one operational parameter; and
  at least one financial data; and
a discrete event simulator (DES) in communication with said FFS, wherein said DES is configured to simulate a process based upon said at least one operational parameter for a first period of time, communicate resultant DES data from said simulation to said FFS, such that said FFS is configured to determine at least one updated operational parameter based upon said communicated resultant DES data and to determine at least one updated financial data based upon said communicated resultant DES data, and said DES is further configured to again simulate said process based upon said at least one updated operational parameter for a sequential second period of time,
wherein said FFS and said DES are further configured to replicate said simulations of said sequential first and second periods of time a plurality of times utilizing at least one new operational parameter and at least one new financial data that are utilized as inputs to said FFS, wherein the at least one new operational parameter and the at least one new financial data comprise statistical variations of the at least one initial operational parameter and the at least one initial financial data, and determine a confidence interval associated with at least one of said at least one updated operational parameter and said at least one updated financial data.

16. The system of claim 15, wherein said FFS and said DES are further configured to continuously alter said at least one operational parameter and said at least one financial data during said simulating of said sequential periods, and continuously replicate said simulations until a desired confidence interval is obtained.

17. The system of claim 15, wherein said confidence interval is based upon an acceptable relative error.

18. The system of claim 15, wherein as said confidence interval increases, an amount of said replications performed increases non-linearly.

19. The system of claim 15, wherein said FFS and said DES are further configured to simulate for twelve (12) sequential periods of time, and replicate said simulations of twelve (12) sequential periods of time.

20. The system of claim 19, wherein said FFS and said DES are further configured to determine a confidence interval for said resultant data replicated for said twelve (12) sequential periods of time.

* * * * *

UNITED STATES PATENT AND TRADEMARK OFFICE
CERTIFICATE OF CORRECTION

| | |
|---|---|
| PATENT NO. | : 9,454,739 B2 |
| APPLICATION NO. | : 12/900851 |
| DATED | : September 27, 2016 |
| INVENTOR(S) | : Meade |

It is certified that error appears in the above-identified patent and that said Letters Patent is hereby corrected as shown below:

In the Specification

Column 12, Line 14:
"(g)" should be -- ($\mu$) --;

Column 12, Line 14:
"a)" should be -- $\sigma$ --;

Column 12, Line 48:
"(g)" should be -- ($\mu$) --;

Column 12, Line 66:
"(x)" should be -- $\bar{x}$ --.

Signed and Sealed this
Seventeenth Day of April, 2018

Andrei Iancu
*Director of the United States Patent and Trademark Office*